(12) United States Patent
Nakai et al.

(10) Patent No.: US 11,265,463 B2
(45) Date of Patent: Mar. 1, 2022

(54) IMAGING APPARATUS AND PHOTOGRAPHING SYSTEM THAT CONTROLS MULTIPLE CAMERAS TO PERFORM IMAGING BY EACH CAMERA AT A DIFFERENT FRAME RATE

(71) Applicant: CASIO COMPUTER CO., LTD., Tokyo (JP)

(72) Inventors: Takao Nakai, Fussa (JP); Takehito Morimatsu, Fussa (JP)

(73) Assignee: CASIO COMPUTER CO., LTD., Tokyo (JP)

( * ) Notice: Subject to any disclaimer, the term of this patent is extended or adjusted under 35 U.S.C. 154(b) by 0 days.

(21) Appl. No.: 17/168,404

(22) Filed: Feb. 5, 2021

(65) Prior Publication Data
US 2021/0274088 A1 Sep. 2, 2021

(30) Foreign Application Priority Data
Feb. 28, 2020 (JP) .............................. JP2020-032532

(51) Int. Cl.
*H04N 5/232* (2006.01)
*G06K 9/00* (2006.01)
*H04N 5/247* (2006.01)

(52) U.S. Cl.
CPC ..... *H04N 5/23219* (2013.01); *G06K 9/00228* (2013.01); *H04N 5/23232* (2013.01); *H04N 5/247* (2013.01)

(58) Field of Classification Search
CPC ............... H04N 5/23219; H04N 5/247; H04N 5/23232; G06K 9/00228; G06K 9/00221; G06K 9/3241
See application file for complete search history.

(56) References Cited

U.S. PATENT DOCUMENTS

| | | | | |
|---|---|---|---|---|
| 9,986,148 | B2 * | 5/2018 | Xiao | H04N 5/2258 |
| 10,429,608 | B1 * | 10/2019 | Baer | G03B 19/22 |
| 2017/0064188 | A1 * | 3/2017 | Yoshida | H04N 5/232945 |
| 2018/0241922 | A1 * | 8/2018 | Baldwin | H04N 5/23241 |
| 2019/0141307 | A1 * | 5/2019 | Youn | H04N 5/23216 |

FOREIGN PATENT DOCUMENTS

| | | |
|---|---|---|
| JP | 2010239169 A | 10/2010 |
| JP | 2013121005 A | 6/2013 |

* cited by examiner

*Primary Examiner* — Luong T Nguyen
(74) *Attorney, Agent, or Firm* — Holtz, Holtz & Volek PC

(57) ABSTRACT

A low-resolution/high-framerate camera performs steady-basis imaging, and a server detects an area of a person, based on frame data from the low-resolution/high-framerate camera, and generates and outputs to a high-resolution/low-framerate camera imaging condition data. The high-resolution/low-framerate camera starts imaging based on the imaging condition data and outputs frame data to the server. The server performs trimming processing to extract from the frame data output from the high-resolution/low-framerate camera an area of a face of the person, recording of image data of the facial area, and sending of the image data to an external recognition device.

11 Claims, 5 Drawing Sheets

| AF CONTROL DATA | EXPOSURE CONTROL DATA | PHOTOGRAPHIC SUBJECT POSITION DATA |

IMAGING APPARATUS AND PHOTOGRAPHING SYSTEM THAT CONTROLS MULTIPLE CAMERAS TO PERFORM IMAGING BY EACH CAMERA AT A DIFFERENT FRAME RATE

CROSS-REFERENCE TO RELATED APPLICATION

This application claims the benefit of Japanese Patent Application No. 2020-032532, filed on Feb. 28, 2020, the entire disclosure of which is incorporated by reference herein.

FIELD

The present disclosure relates to an imaging apparatus, a photographic system, an imaging method, and a recording medium.

BACKGROUND

A camera is known heretofore that, while photographing a changing photographic subject using consecutive pixel thinning, performs recording that uses all pixels upon the photographic subject entering a prescribed state (for example, see Unexamined Japanese Patent Application Publication No. 2010-239169).

Upon detection of the prescribed state by operating an image sensor so as to control the pixels to be input in such a camera, a high-resolution image is recorded for all pixels at the framerate, thereby enabling recording of images with high resolution.

SUMMARY

In order to achieve the above objective, an imaging apparatus includes: a first camera; a second camera; and at least one processor, wherein the at least one processor controls the first camera to perform imaging by the first camera by running the first camera at a first framerate, controls the second camera to perform imaging by the second camera by running the second camera at a second framerate different from the first framerate, and based on content of an image imaged by one of the first camera and the second camera, controls a recording timing of an image imaged by another one of the first camera and the second camera.

In order to achieve the above objective, a photographic system includes: a server; and two cameras, wherein the server comprises at least one processor, and the at least one processor controls the two cameras to: perform imaging by one of the two cameras by running the one of the two cameras at a first framerate; and perform imaging by another one of the two cameras by running the another one of the two cameras at a second framerate different from the first framerate, and controls a recording timing of an image imaged by the another one of the two cameras based on content of an image imaged by the one of the two cameras In order to achieve the above objective, an imaging method includes: controlling two cameras to: perform imaging by one of the two cameras by running the one of the two cameras at a first framerate; and perform imaging by another one of the two cameras by running the another one of the two cameras at a second framerate different from the first framerate; and controlling a recording timing of an image imaged by the another one of the two cameras based on content of an image imaged by the one of the two cameras.

In order to achieve the above objective, a non-transitory recording medium records a program for causing a computer to function by: controlling two cameras to: perform imaging by one of the two cameras by running the one of the two cameras at a first framerate; and perform imaging by another one of the two cameras by running the another one of the two cameras at a second framerate different from the first framerate; and controlling a recording timing of an image imaged by the another one of the two cameras based on content of an image imaged by the one of the two cameras.

BRIEF DESCRIPTION OF THE DRAWINGS

A more complete understanding of this application can be obtained when the following detailed description is considered in conjunction with the following drawings, in which.

DETAILED DESCRIPTION

An imaging apparatus according to an embodiment of the present disclosure is described hereinafter with reference to drawings.

Figure 1:
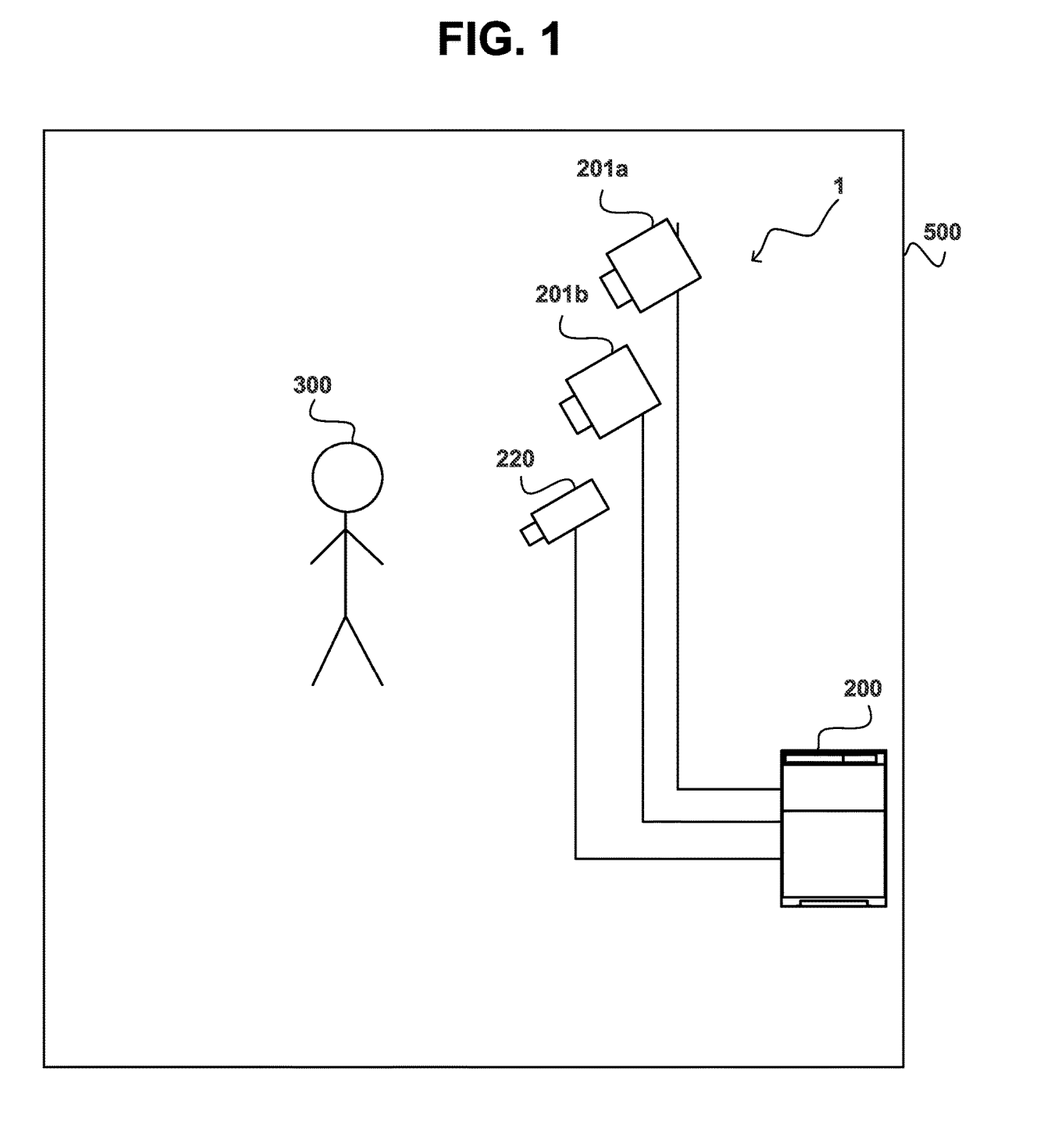
FIG. 1 illustrates an example of a photographic system according to an embodiment of the present disclosure.

FIG. 1 illustrates configuration of a photographic system that uses an imaging device. A photographic system 1 illustrated in FIG. 1 generates information required for face authentication of a person 300 present within a space 500, and includes a server 200, a camera 201a corresponding to a first camera, a camera 201b corresponding to a second camera, and a distance sensor 220.

In the present embodiment, the camera 201a and the camera 201b are located near each other and have nearly the same imaging range. In a comparison between the camera 201a and the camera 201b, a pixel count of the camera 201b is higher than that of the camera 201a for the provided imaging sensors of the configuration, and conversely, an image data-input speed of a driver driving the image sensor, that is, the framerate, is higher for the camera 201a than for the camera 201b. For example, the camera 201a is equipped with an image sensor that has a pixel count of 2 megapixels (2 Mpix) and has a driver with a framerate of 800 frames/second (800 fps); and the camera 201b is equipped with an image sensor that has a pixel count of 48 megapixels (48 Mpix) and has a driver with a framerate of 30 frames/second (30 fps). Moreover, the framerates of the drivers of the camera 201a and the camera 201b can be changed on the basis of control by the server 200.

The camera 201a generates frames by performing imaging at low resolution and high framerate, that is, at a first framerate; and the camera 201b generates frames by performing imaging at high resolution and low framerate, that is, at a second framerate. The camera 201a and the camera 201b output to the server 200 data of the generated frames.

The distance sensor 220 is arranged in the vicinity of the camera 201*a* and the camera 201*b*. The distance sensor 220 measures a distance to the person 300 as a photographic subject that is a moving object, and outputs to the server 200 distance data obtained by the measurement.

Upon detection in the frame generated by the camera 201*a* that is performing sequential imaging a face of a person 300 who is the photographic subject, the server 200 sets an imaging condition of the camera 201*b* based on distance information or the like measured by the distance sensor 220.

Upon input of the imaging condition set by the server 200, the camera 201*b* starts imaging. The server 200 performs trimming processing that extracts from the frame generated by the camera 201*b* a facial image of the person 300 who is the photographic subject, and transmits image data obtained by the trimming processing to a non-illustrated external device for performing recognition.

Figure 2:
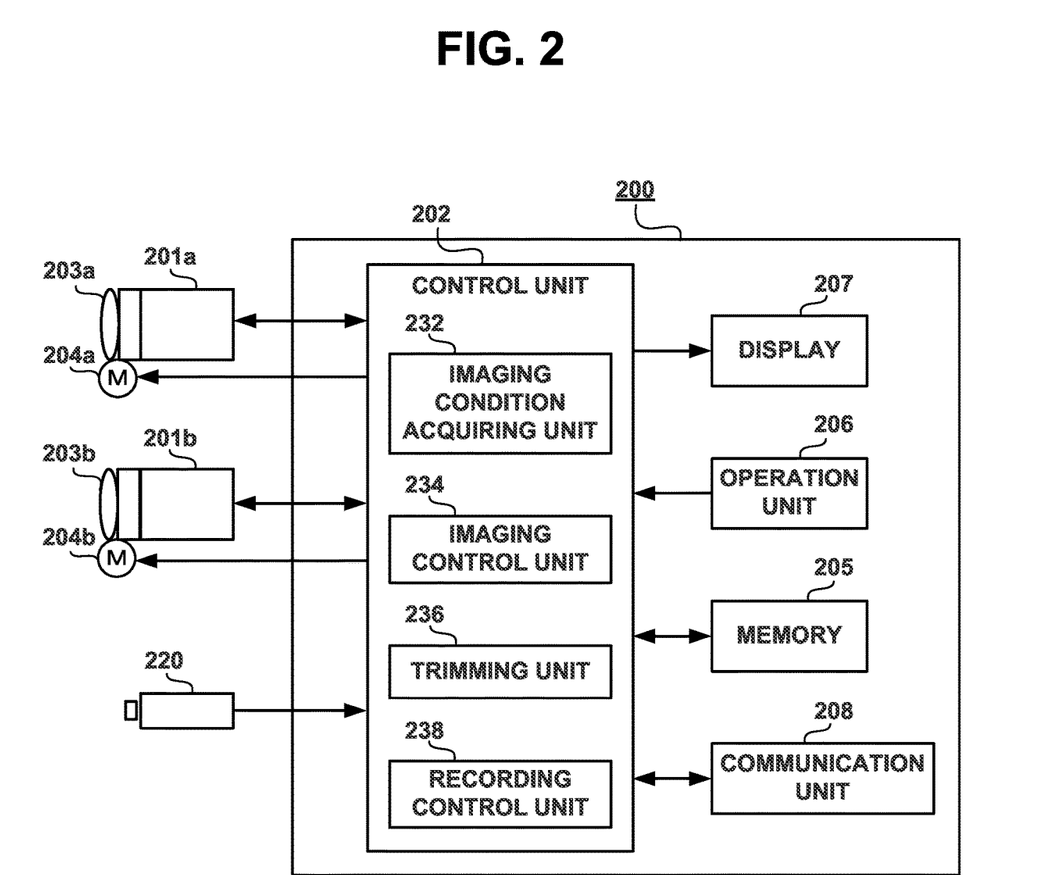
FIG. 2 illustrates an example of configuration of a server, a camera, and a distance sensor according to the same embodiment.

FIG. 2 illustrates an example of configuration of the server 200, the camera 201*a*, the camera 201*b*, and the distance sensor 220. As illustrated in FIG. 2, the server 200 includes a control unit 202, a memory 205, an operation unit 206, a display 207, and a communication unit 208. The server 200 is connected through wiring to the cameras 201*a* and 201*b* and the distance sensor 220.

The camera 201*a* includes a lens 203*a* and a lens motor 204*a*, and the camera 201*b* includes a lens 203*b* and a lens motor 204*b*; and hereinafter, appropriate reference may be made to a "lens 203" without restriction to the respective lens 203*a* or 203*b*, and appropriate reference may be made to a "lens motor 204" without restriction to the respective lens motor 204*a* or 204*b*. The lens 203 includes a zoom lens or the like. The lens 203 moves due to driving of the lens motor 204 in accordance with zoom control operation from the operation unit 206 and focal control by the control unit 202. An imaging view angle and an optical image imaged by the camera 201 are controlled by movement of the lens 203.

The cameras 201*a* and 201*b* each include multiple photodetector elements that are arrayed two-dimensionally in a regular pattern on a light receiving surface. The light receiving element is an imaging device such as a charge coupled device (CCD) or a complementary metal oxide semiconductor (CMOS). The camera 201*a* or 201*b* takes (receives light of) the optical image from light input through the lens 203 using an imaging view angle of a prescribed region on the basis of a control signal from the control unit 202, and generates the frame by converting to digital data an image signal within the imaging view angle. The cameras 201*a* and 201*b* perform imaging and generation of frames, and then output to the server 200 the sequential frame data. Moreover, the camera 201*a* outputs to the server 200 exposure control data that is information (exposure information) indicating a value of exposure during imaging thereby.

The control unit 202 includes a central processing unit (CPU), for example. The control unit 202 controls, by execution of software processing in accordance with a program stored in the memory 205 such as a program for achievement of operations illustrated in a below-described FIG. 4, various types of functions provided for the server 200.

The control unit 202 acquires data, that is, digital data, of the frames output from the cameras 201*a* and 201*b*. The control unit 202 adjusts image quality and image size of the frame, and performs control to cause display as a through image on the display 207.

The memory 205 is random access memory (RAM) or read only memory (ROM), for example. The memory 205 stores various types of information, such as programs, used by the server 200 for control or the like.

The operation unit 206 includes a numeric keypad, function keys, or the like, and is an interface that is used for a user to input operational content. The display 207, for example, includes a liquid crystal display (LCD), a plasma display panel (PDP), an electro-luminescence (EL) display, or the like. The display 207 displays the image in accordance with the image signal output from the control unit 202.

The communication unit 208, for example, is a local area network (LAN) card. The communication unit 208 performs communication with various types of devices such as with the external device that performs recognition.

Moreover, the control unit 202 includes an imaging condition acquiring unit 232, an imaging control unit 234, a trimming unit 236, and a recording control unit 238.

In the aforementioned manner, the camera 201*a* performs imaging and generation of the frame, and then outputs frame data and exposure control data to the server 200. The imaging condition acquiring unit 232 acquires the exposure control data from the camera 201*a*. Moreover, the imaging condition acquiring unit 232 acquires the distance data from the distance sensor 220.

The imaging control unit 234 generates autofocus (AF) control data that is information (focus information) indicating an optimum focus position of a focusing lens during imaging of the person 300 on the basis of distance data acquired by the imaging condition acquiring unit 232.

Furthermore, the imaging control unit 234 performs image analysis of the frame data from the camera 201*a*, and attempts to detect within the frame an area of the person 300 who is the photographic subject. If the area of the person 300 is detected, the imaging control unit 234 generates photographic subject position data indicating the position of the person 300 within the frame.

Figure 3:
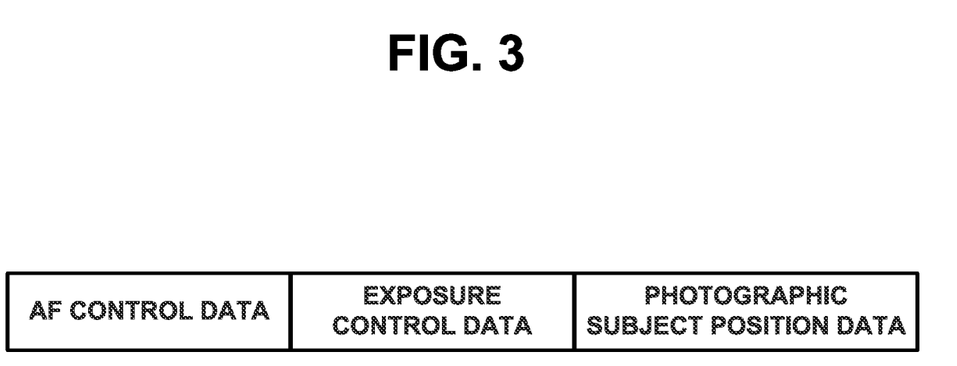
FIG. 3 illustrates an example of imaging condition data according to the same embodiment.

Next, as illustrated in FIG. 3, the imaging control unit 234 generates imaging condition data that includes the AF control data, the exposure control data, and the photographic subject position data, and outputs the imaging condition data, together with an imaging start command, to the camera 201*b*.

Upon acquiring the imaging condition data and the imaging start command, based on the AF control data within the imaging condition data, the camera 201*b* sets a focus position of the focusing lens with which the camera 201*b* is equipped, and on the basis of the exposure control data within the imaging condition data, sets an exposure condition for a non-illustrated photographic control unit with which the camera 201*b* is equipped. Furthermore, on the basis of the photographic subject position data within the imaging condition data, the camera 201*b* sets as the imaging region a region that includes the person 300. Upon setting of the imaging condition that includes the focus position, the exposure condition, and the imaging region, the camera 201*b* starts imaging in accordance with the imaging start command, generates the frame, and outputs the frame data to the control unit 202 within the server 200.

The trimming unit 236 within the control unit 202 performs image analysis of the frame data from the camera 201*b*, and attempts to detect the area of the face of the person 300 who is the photographic subject within the frame. Furthermore, upon detection of the area of the face of the person 300, the trimming unit 236 performs the trimming processing to extract the area of the face of the person 300 from the frame data.

The recording control unit 238 causes the memory 205 to store image data, that is, facial image data, corresponding to the area of the face of the person 300 obtained by the trimming processing. Furthermore, the recording control unit 238 outputs to the communication unit 208 the facial image data. The communication unit 208 transmits the facial image data to the external device, that is, the authentication device, that performs face authentication. The authentication device uses the received facial image data to perform recognition of the person 300.

Figure 4:
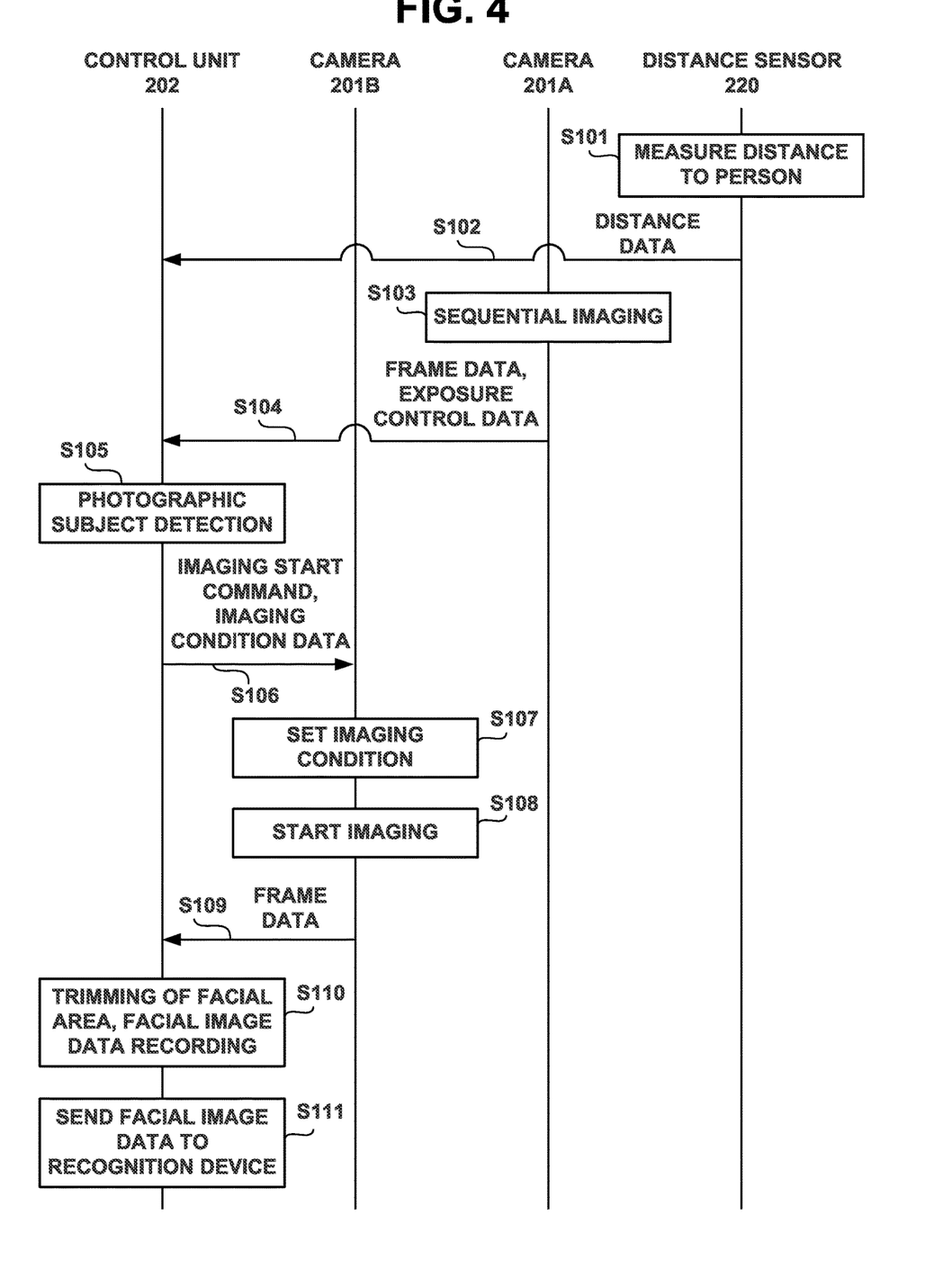
FIG. 4 illustrates an example of a timing chart indicating operation of a control unit, the camera, and the distance sensor according to the same embodiment.

Operation of the control unit 202, the cameras 201a and 201b, and the distance sensor 220 is explained next with reference to the timing chart of FIG. 4.

The distance sensor 220 measures the distance to the person 300 as the photographic subject (step S101). Furthermore, the distance sensor 220 outputs the distance data obtained by measurement to the control unit 202 within the server 200. The imaging condition acquiring unit 232 within the control unit 202 acquires the distance data from the distance sensor 220 (step S102).

Moreover, in parallel with the measurement by the distance sensor 220, the camera 201a performs sequential imaging (step S103). The camera 201a performs imaging together with generation of the frame, and outputs to the control unit 202 within the server 200 the frame data and the exposure control data. The imaging condition acquiring unit 232 within the control unit 202 acquires the frame data and the exposure control data from the camera 201a (step S104).

Next, the imaging control unit 234 performs image analysis of the frame data from the camera 201a, and attempts to detect within the frame the area of the person 300 who is the photographic subject (step S105).

Upon detection of the area of the person 300, the imaging control unit 234 generates photographic subject position data indicating the position of the person 300 within the frame. Moreover, the imaging control unit 234 generates the AF control data on the basis of the distance data. The imaging control unit 234 generates the imaging condition data that includes the AF control data, the exposure control data, and the photographic subject position data, and outputs the imaging condition data, together with the imaging start command, to the camera 201b. The camera 201b acquires the imaging start command and the imaging condition data (step S106).

Next, the camera 201b sets the imaging condition (step S107). Specifically, the camera 201b sets the focus position of the focusing lens on the basis of the AF control data within the imaging condition data, sets the exposure condition for the photographic control unit on the basis of the exposure control data within the imaging condition data, and sets as the imaging region the region that includes the person 300 on the basis of the photographic subject position data within the imaging condition data.

Furthermore, the camera 201b starts the imaging in accordance with the imaging start command (step S108), generates the frame, and outputs the frame data to the control unit 202 within the server 200. The trimming unit 236 within the control unit 202 acquires the frame data from the camera 201b (step S109).

The trimming unit 236 performs image analysis of the frame data from the camera 201b, and attempts to detect the area of the face of the person 300 who is the photographic subject within the frame. Furthermore, upon detection of the area of the face of the person 300, the trimming unit 236 performs trimming processing to extract the area of the face of the person 300 from the frame data.

Figure 5:
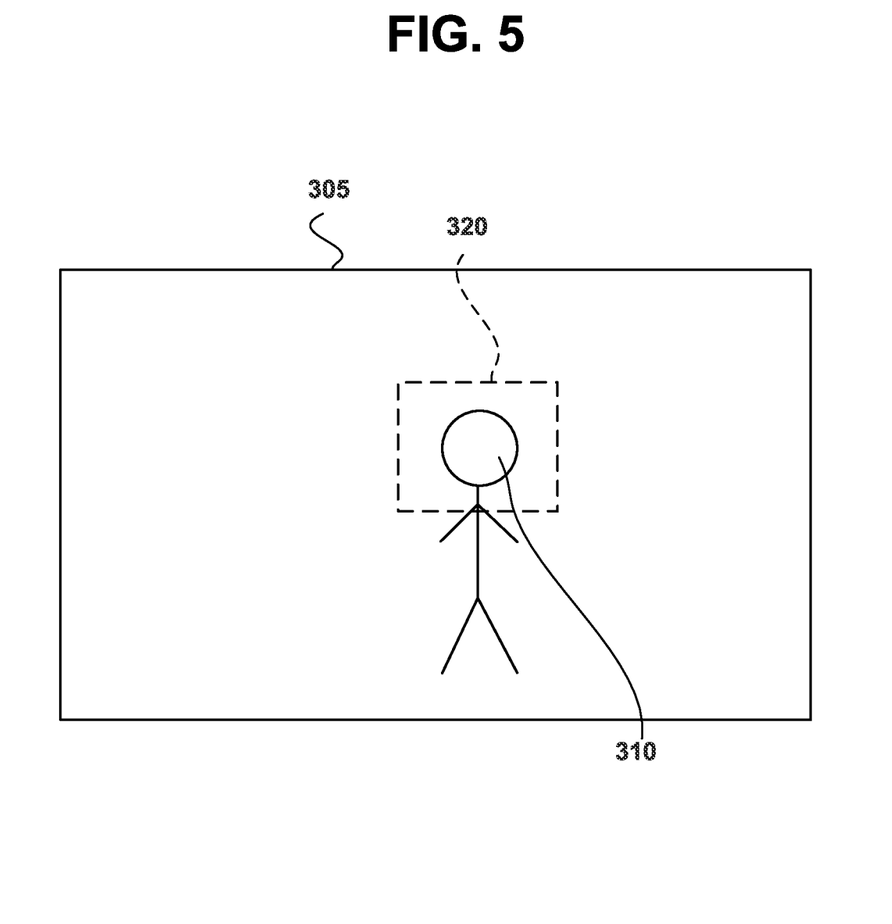
FIG. 5 illustrates an example of trimming processing according to the same embodiment.

FIG. 5 illustrates an example of the trimming processing. Upon detection of a facial area 310 within a frame 305, the trimming unit 236 sets a trimming area 320 that includes the facial area 310, and generates image data corresponding to the trimming area 320.

Description continues with reference again to FIG. 4. The recording control unit 238 causes the memory 205 to store the image data, that is, the facial image data, corresponding to the area of the face of the person 300 obtained by the trimming processing (step S110).

Furthermore, the recording control unit 238 transmits to the external recognition device the facial image data via the communication unit 208 (step S111).

The present embodiment in the aforementioned manner uses the camera 201a of low resolution and high framerate and the camera 201b of high resolution and low framerate. Also, the camera 201a performs sequential imaging, and on the basis of the frame data from the camera 201a, the server 200 attempts to detect the area of the person 300 who is the photographic subject within the frame. Upon detection of the area of the person 300, the server 200 generates the imaging condition data that includes the AF control data, the exposure control data, and the photographic subject position data, and outputs the imaging condition data together with the imaging start command to the camera 201b. The camera 201b sets the imaging condition on the basis of the imaging condition data, and outputs the frame data to the server 200. The server 200 performs image analysis of the frame data from the camera 201b, performs trimming processing to extract the area of the face of the person 300 from the frame data, and together with recording the image data of the facial area, transmits the image data of the facial area to the external recognition device. That is to say, on the basis of the content of the image imaged by the camera 201a, the server 200 controls the recording timing of the image imaged by the camera 201b.

Although the image data of the facial area used for recognition is required to have high resolution, such resolution results in a large amount of data. Therefore, in the present embodiment, the camera 201a of low resolution and high framerate is used to perform steady-basis imaging for detection of the area of the person 300, and only upon detection of the area of the person 300, imaging is performed by the camera 201b of high resolution and low framerate, the frame data from the camera 201b is used for extraction of the image data of the area of the face of the person 300, and the extracted image data is recorded and transmitted. Due to such operation, the burden of photographic subject detection processing, that would occur due to imaging of the large amount of the image data at the high framerate and high resolution, is lessened, and recording of the high resolution image data obtained at the appropriate timing and imaging condition can be performed only at an appropriate timing.

Moreover, in the present embodiment, exposure of the camera 201b can be set appropriately by using the exposure control data of the camera 201a for the imaging condition of the camera 201b.

Moreover, in the present embodiment, the distance sensor 220 measures the distance to the person 300 as the photographic subject. Due to such operation, AF control data required for setting the focus of the camera 201b can be generated.

Moreover, in the present embodiment, the photographic subject position data indicating the photographic subject position within the frame according to imaging by the camera 201a can be used as the imaging condition of the camera 201b, thereby enabling the camera 201b to appropriately image the person 300.

Further, the present disclosure is not limited by the description and drawings of the above embodiment, and suitable modifications or the like of the aforementioned embodiment and drawings can be added.

For example, in the aforementioned embodiment, the server 200 performs trimming processing to extract the area of the face of the person 300 from the frame data obtained from the camera 201*b*. However, the area of trimming is not limited to that of the aforementioned embodiment, and the area of trimming may be an entire area of the person 300. Alternatively, in the case of the performance of authentication using the iris, the area of trimming may be the eye of the person 300.

Moreover, in the aforementioned embodiment, upon detection of the person 300 who is the photographic subject based on the frame of the camera 201*a*, the server 200 causes the camera 201*b* to start imaging. However, such operation is not limiting, and upon the person 300 performing a prescribed action, such as facing the camera 201*a*, the server 200 may cause the camera 201*b* to start imaging, since imaging of the face is then considered to be possible at an angle suitable for easy face authentication.

Moreover, the server 200 may be any device with attached cameras 201*a* and 201*b*.

Moreover, in the aforementioned embodiment, the program for execution may be stored and distributed on a computer readable recording medium such as a flexible disc, a compact disc read-only memory (CD-ROM), a digital versatile disc (DVD), a magneto-optical (MO) disc, or the like, and the system for executing the above processing may be formed by installation of such a program.

Moreover, the program may be stored beforehand on a disc device or the like included in a prescribed server on a network such as the Internet, and may be superimposed on a carrier wave, for example, and then downloaded or the like.

Furthermore, in the case of achievement of the aforementioned functions by allocation to the operating system (OS), or achievement in cooperation between the OS and an application, or the like, the non-OS portion itself may be stored in a medium for distribution, downloading, or the like.

The foregoing describes some example embodiments for explanatory purposes. Although the foregoing discussion has presented specific embodiments, persons skilled in the art will recognize that changes may be made in form and detail without departing from the broader spirit and scope of the invention. Accordingly, the specification and drawings are to be regarded in an illustrative rather than a restrictive sense. This detailed description, therefore, is not to be taken in a limiting sense, and the scope of the invention is defined only by the included claims, along with the full range of equivalents to which such claims are entitled.

What is claimed is:

1. An imaging apparatus comprising:
a first camera;
a second camera; and
at least one processor,
wherein:
the at least one processor controls the first camera to perform imaging by the first camera by running the first camera at a first framerate, controls the second camera to perform imaging by the second camera by running the second camera at a second framerate different from the first framerate, and based on content of an image imaged by one of the first camera and the second camera, controls a recording timing of an image imaged by another one of the first camera and the second camera;
the at least one processor acquires an imaging condition of the one of the first camera and the second camera, and sets the acquired imaging condition on the another one of the first camera and the second camera;
upon detection of a prescribed image area in the image imaged by the one of the first camera and the second camera, the at least one processor controls the recording timing of the image imaged by the another one of the first camera and the second camera; and
the at least one processor sends, to the another one of the first camera and the second camera, notification of a position of the prescribed image area.

2. The imaging apparatus according to claim 1,
wherein:
the prescribed image area is an image area including a prescribed photographic subject image,
the at least one processor acquires a distance from the imaging apparatus to a photographic subject corresponding to the prescribed photographic subject image, and
the imaging condition includes a condition relating to focus information based on the acquired distance.

3. The imaging apparatus according to claim 1, wherein the imaging condition includes a condition relating to exposure information during recording of a prescribed photographic subject image.

4. The imaging apparatus according to claim 1, wherein the first framerate is faster than the second framerate.

5. The imaging apparatus according to claim 1, wherein the second camera has resolution higher than resolution of the first camera.

6. The imaging apparatus according to claim 1, wherein the at least one processor trims, from the image imaged by the another one of the first camera and the second camera, a region that includes the position of the prescribed image area.

7. The imaging apparatus according to claim 6, wherein the at least one processor transmits an image obtained by the trimming to outside of the imaging apparatus.

8. The imaging apparatus according to claim 1, wherein the prescribed image area is an area of a person, a face of a person, or an eye within a facial image.

9. A photographic system comprising:
a server; and
two cameras,
wherein:
the server comprises at least one processor, and
the at least one processor:
controls the two cameras to: perform imaging by one of the two cameras by running the one of the two cameras at a first framerate; and perform imaging by another one of the two cameras by running the another one of the two cameras at a second framerate different from the first framerate, and
controls a recording timing of an image imaged by the another one of the two cameras based on content of an image imaged by the one of the two cameras,
acquires an imaging condition of the one of the two cameras, and sets the acquired imaging condition on the another one of the two cameras,
upon detection of a prescribed image area in the image imaged by the one of the two cameras, controls the recording timing of the image imaged by the another one of the two cameras, and sends, to the another one of the two cameras, notification of a position of the prescribed image area.

10. An imaging method comprising:

controlling two cameras to: perform imaging by one of the two cameras by running the one of the two cameras at a first framerate; and perform imaging by another one of the two cameras by running the another one of the two cameras at a second framerate different from the first framerate; and controlling a recording timing of an image imaged by the another one of the two cameras based on content of an image imaged by the one of the two cameras;

wherein the imaging method further comprises:

acquiring an imaging condition of the one of the two cameras, and setting the acquired imaging condition on the another one of the two cameras, upon detection of a prescribed image area in the image imaged by the one of the two cameras, controlling the recording timing of the image imaged by the another one of the two cameras, and sending, to the another one of the two cameras, notification of a position of the prescribed image area.

11. A non-transitory recording medium recording a program that is executable by a computer to control the computer to perform functions comprising:

controlling two cameras to: perform imaging by one of the two cameras by running the one of the two cameras at a first framerate; and perform imaging by another one of the two cameras by running the another one of the two cameras at a second framerate different from the first framerate; and controlling a recording timing of an image imaged by the another one of the two cameras based on content of an image imaged by the one of the two cameras, wherein the program is executable by the computer to control the computer to perform further other functions comprising:

acquiring an imaging condition of the one of the two cameras, and setting the acquired imaging condition on the another one of the two cameras, upon detection of a prescribed image area in the image imaged by the one of the two cameras, controlling the recording timing of the image imaged by the another one of the two cameras, and sending, to the another one of the two cameras, notification of a position of the prescribed image area.

* * * * *